United States Patent
Kobayashi et al.

(10) Patent No.: US 7,502,295 B2
(45) Date of Patent: Mar. 10, 2009

(54) METHOD FOR RECORDING INFORMATION ON OPTICAL RECORDING MEDIUM AND INFORMATION RECORDING APPARATUS

(75) Inventors: Tatsuhiro Kobayashi, Tokyo (JP); Koji Mishima, Tokyo (JP)

(73) Assignee: TDK Corporation, Tokyo (JP)

(*) Notice: Subject to any disclaimer, the term of this patent is extended or adjusted under 35 U.S.C. 154(b) by 347 days.

(21) Appl. No.: 11/054,411

(22) Filed: Feb. 10, 2005

(65) Prior Publication Data
US 2005/0243677 A1 Nov. 3, 2005

(30) Foreign Application Priority Data
Feb. 12, 2004 (JP) ............... 2004-034368

(51) Int. Cl.
*G11B 7/00* (2006.01)
(52) U.S. Cl. .................. 369/59.11; 369/59.12
(58) Field of Classification Search .............. 369/59.11, 369/59.12
See application file for complete search history.

(56) References Cited

U.S. PATENT DOCUMENTS

| | | | | |
|---|---|---|---|---|
| 5,732,062 | A * | 3/1998 | Yokoi et al. ................. | 369/116 |
| 5,818,808 | A * | 10/1998 | Takada et al. ............... | 369/116 |
| 6,631,110 | B1 * | 10/2003 | Seo et al. ................... | 369/59.12 |
| 7,068,579 | B2 * | 6/2006 | Tasaka et al. ............. | 369/59.24 |
| 2003/0063543 | A1 * | 4/2003 | Langereis et al. ........ | 369/59.12 |
| 2003/0067856 | A1 * | 4/2003 | Toda et al. ................. | 369/59.11 |
| 2003/0227850 | A1 * | 12/2003 | Kato et al. ................. | 369/59.11 |
| 2005/0094529 | A1 * | 5/2005 | Lee et al. ................... | 369/59.12 |
| 2006/0067197 | A1 * | 3/2006 | Mizushima et al. ........ | 369/116 |
| 2007/0223340 | A1 * | 9/2007 | Shirota et al. ............. | 369/59.11 |

FOREIGN PATENT DOCUMENTS

| | | |
|---|---|---|
| JP | 9-305971 | 11/1997 |
| JP | 2001-67669 | 3/2001 |
| JP | 2001-176072 | 6/2001 |
| JP | 2003-30836 | 1/2003 |
| JP | 2003-85753 | 3/2003 |
| JP | 2003-203383 | 7/2003 |
| JP | 2004-5835 | 1/2004 |

* cited by examiner

*Primary Examiner*—Wayne R Young
*Assistant Examiner*—Linh T Nguyen
(74) *Attorney, Agent, or Firm*—Oblon, Spivak, McClelland, Maier & Neustadt, P.C.

(57) ABSTRACT

According to the invention, a record mark is formed by: using one ON-pulse pattern and one ON-pulse pattern following it when the record mark to be formed is shorter than a specified length X (nT<X); and using two ON-pulse patterns and two ON-pulse patterns respectively following them when the record mark to be formed is longer than the specified length X (nT>X). This makes is possible to secure a heat amount per unit time sufficiently in forming a short record mark even when a targeted recording linear velocity is high. Also, an unwanted heat pocket becomes hard to arise in the record layer even when a sufficient heat amount per unit time is secured in forming a long record mark. Therefore, it becomes possible to form a record mark having a good shape even when data is recorded at a high linear velocity.

14 Claims, 4 Drawing Sheets

METHOD FOR RECORDING INFORMATION ON OPTICAL RECORDING MEDIUM AND INFORMATION RECORDING APPARATUS

BACKGROUND OF THE INVENTION

The present invention relates to a method for recording information on an optical recording medium, especially a method for recording information on a write-once type optical recording medium. Also, the invention relates to an information recording apparatus for recording information on an optical recording medium, especially an information recording apparatus for recording information on a write-once type optical recording medium.

In recent years, there have been proposed next-generation optical recording media which have a much larger recording capacity in comparison to conventional ones and which allow the achievement of an extremely higher data transfer rate, and some of them have come into practical use (see Patent Document 1, JP-A-2003-203383). Unlike a conventional optical recording medium, with such next-generation optical recording media, a laser beam of a wavelength of about 205 nm and an objective having a numerical aperture of about 0.85 are used for data recording and reproduction. This allows the beam spot diameter of a laser beam to be narrowed down to about 0.39 μm in a plane of recording, thereby achieving a recording capacity of about 25 GB/side and a data transfer rate of about 36 Mbps at a reference linear velocity (about 4.9 m/sec).

Also, in regard to next-generation optical recording media, various types of optical recording media such as read-only type, write-once type, and rewritable type have been proposed like existing optical recording media including CDs (Compact Disc) and DVD (Digital Versatile Disc). However, of these media, write-once type ones have been known to have the feature that a heat amount per unit time required for data recording is increased with an increase in targeted recording linear velocity. In order to increase a heat amount per unit time, it is necessary to use a higher-power semiconductor laser, or to further lengthen the length of an ON-pulse pattern, i.e. the time to set the intensity of a laser beam at a recording-power level.

[Patent Document 1] JP-A-2003-203383

However, a laser beam to be used for next-generation optical recording media is a light in a blue-color wavelength region as described above, and a semiconductor laser capable of generating such laser beam at a high output power is very expensive. Hence, in order to increase a heat amount to be applied per unit time thereby to enable recording at an extremely high linear velocity e.g. a fourfold data rate, it is useful to lengthen the length of an ON-pulse pattern, i.e. the time to set the intensity of a laser beam at a recording-power level as far as possible. Therefore, adopting a pulse train pattern (i.e. so-called solid pattern) in which one ON-pulse pattern is used to form a record mark can make the time to set the intensity of a laser beam at a recording-power level longest. However, using such pulse train pattern poses a problem such that an unwanted heat pocket is produced in a record layer in forming a long record mark, thereby causing a thermal interference and thus deteriorating recording properties.

SUMMARY OF THE INVENTION

Therefore, it is an object of the invention to provide a method for recording information on a write-once type optical recording medium, which is suitable for data recording at a high linear velocity.

Also, it is another object of the invention to provide an information recording apparatus for recording information on a write-once type optical recording medium, which enables data recording at a high linear velocity.

The method for recording information of the invention is an information recording method for recording information by irradiating a write-once type optical recording medium having a base and at least one record layer on the base with a laser beam modulated according to a pulse train pattern including at least a recording-power level, a base power level, and a medium power level having a power intermediate between the recording-power and base power levels to form a record mark in the record layer, wherein the pulse train pattern includes at least one ON-pulse pattern and at least one OFF-pulse pattern, the ON-pulse pattern transitions from one of the base power level and the medium power level to the recording-power level, and then transitions from the recording-power level to the base power level, the OFF-pulse pattern includes the base power level following the ON-pulse pattern, and when the record mark longer than a specified length is formed, the number of the at least one ON-pulse pattern to be used is two, and a length of the OFF-pulse pattern following the last ON-pulse pattern is made constant regardless of a length of the record mark to be formed.

The information recording apparatus of the invention is an information recording apparatus for recording information by irradiating a write-once type optical recording medium having a base and at least one record layer on the base with a laser beam modulated according to a pulse train pattern including at least a recording-power level, a base power level, and a medium power level having a power intermediate between the recording-power and base power levels to form a record mark in the record layer, the apparatus arranged so that the pulse train pattern includes at least one ON-pulse pattern and at least one OFF-pulse pattern, the ON-pulse pattern transitions from one of the base power level and the medium power level to the recording-power level, and then transitions from the recording-power level to the base power level, the OFF-pulse pattern includes the base power level following the ON-pulse pattern, and when the record mark longer than a specified length is formed, the number of the at least one ON-pulse pattern to be used is two, and a length of the OFF-pulse pattern following the last ON-pulse pattern is made constant regardless of a length of the record mark to be formed.

According to the invention, the number of the ON-pulse patterns is two in forming a long mark, which makes an unwanted heat pocket hard to arise in the record layer. Thus, it becomes possible to form a record mark having a good shape. Moreover, because the length of the OFF-pulse pattern following the last ON-pulse pattern is made constant, the degree of the thermal interference with a record mark to be formed subsequently is rendered almost constant regardless of the kind of the record mark and thus a deviation in the length of the space region between a record mark in question and another record mark to be recorded subsequently becomes less prone to being caused.

In the invention, it is preferable that the number of the ON-pulse patterns in forming a record mark shorter than the specified length is one. When the number of ON-pulse patterns in forming a short mark in this way is one, i.e. the pulse pattern is a solid pattern, it becomes possible to secure a heat amount per unit time sufficiently even with a high targeted recording linear velocity and therefore a record mark having a good shape can be formed.

In the invention, it is preferable that the length of the OFF-pulse pattern located between the two ON-pulse patterns is made longer as the length of the record mark to be formed is longer when a record mark longer than the predetermined length is formed. This makes possible to effectively prevent a heat pocket from taking place when a long mark easy to produce a heat pocket is formed.

In the invention, it is preferable that $$nT*0.70 \leq t_{total} \leq nT*0.85,$$

where a sum of the lengths of the two ON-pulse patterns used in forming the record mark longer than the specified length is $t_{total}$, and the length of the record mark to be formed is nT (T is a clock cycle). This makes a heat amount to be applied optimal and as such, it becomes possible to form a record mark having a good shape.

In the invention, it is preferable that $$t_{total}*0.45 \leq t_{top} \leq t_{total}*0.65,$$

where a length of first applied one of the two ON-pulse patterns used in forming the record mark longer than the specified length is $t_{top}$.

This is because when the difference in length between the two ON-pulse patterns is too large, heating by the shorter ON-pulse pattern doesn't work out effectively, deteriorating the jitter.

In the invention, it is preferable that, of the two ON-pulse patterns used in forming the record mark longer than the specified length, a length of the OFF-pulse pattern following the last ON-pulse pattern is from 0.4T to 0.5T inclusive. The reason for this is twofold. The first is that when the length of the OFF-pulse pattern following the second ON-pulse pattern is made too long, the length of the first OFF-pulse pattern must be shortened accordingly, thereby excessively reducing the kinds of record marks which can be formed using the two ON-pulse patterns. The second is that when the length of the OFF-pulse pattern following the second ON-pulse pattern is made too short reversely, the length of the first OFF-pulse pattern must be made longer, whereby the first OFF-pulse pattern could cause the record mark to dispart.

In the invention, it is preferable that the specified length is $0.82*\lambda/NA$, where a wavelength of the laser beam is $\lambda$, a numerical aperture of an objective for condensing the laser beam is NA. The length given by $0.82*\lambda/NA$ represents to the diameter of a beam spot. This avoids that the intensity of the laser beam 50 is fixed at the recording-power level Pw over all the periods when the beam spot goes through a certain point. As a result, it becomes possible to prevent the occurrence of an excessive heat pocket.

In the invention, it is preferable that the following condition is satisfied:

$$\lambda/NA \leq 640 \text{ nm,}$$

where a wavelength of the laser beam is $\lambda$, and a numerical aperture of an objective for condensing the laser beam is NA. The reason for this is that the recording linear velocity must be set higher because a system incorporating an optical system like this requires a remarkably high data transfer rate.

In the manner as stated above, the invention makes possible not only to sufficiently secure a heat amount per unit time even when a targeted recording linear velocity is high, but also to form a record mark having a good shape even when the mark to be formed is long because an unwanted heat pocket is hard to arise in the record layer. Moreover, the degree of the thermal interference with a record mark to be formed subsequently is rendered almost constant regardless of the kind of the record mark and as such, a deviation in the length of the space region between a record mark in question and another record mark to be recorded subsequently becomes less prone to being caused.

Therefore, the invention allows good signal characteristics to be obtained even when data is recorded at a high linear velocity.

BRIEF DESCRIPTION OF THE DRAWINGS

FIG. 1A is a perspective view, partially broken away, and FIG. 1B is a fragmentary sectional view showing the part A shown in FIG. 1A in a magnified form.

FIG. 2A shows a pulse train pattern when a record mark shorter than the specified length X is formed, and FIG. 2B shows a pulse train pattern when a record mark longer than the specified length X is formed.

DETAILED DESCRIPTION OF THE PREFERRED EMBODIMENTS

The preferred embodiment of the invention will be described in detail below in reference to the accompanying drawings.

Figure 1A:
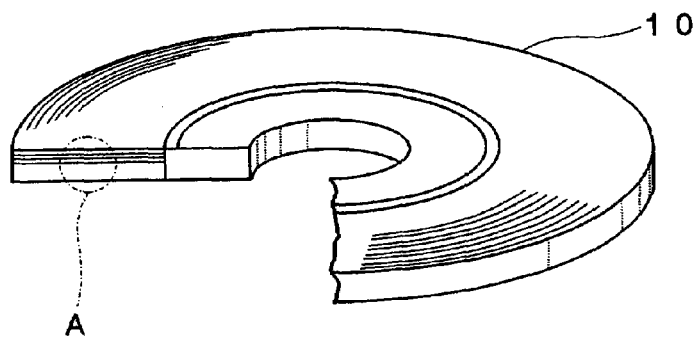
FIGS. 1A and 1B are views showing a structure of an optical recording medium 10 according to a preferred embodiment of the invention. More specifically.
Figure 1B:
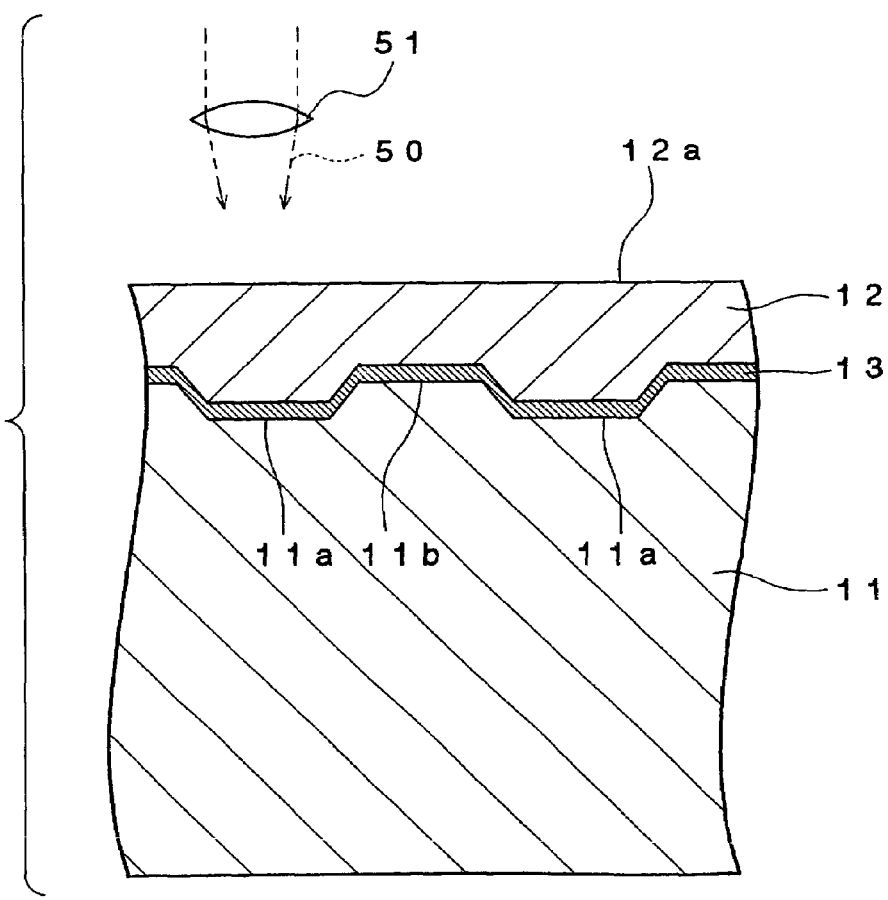

FIG. 1A is a perspective view, partially broken away, and it shows the appearance of an optical recording medium 10 according to a preferred embodiment of the invention. FIG. 1B is a fragmentary sectional view showing the part A shown in FIG. 1A in a magnified form.

As shown in FIG. 1A, the optical recording medium 10 according to the embodiment is a disc-like optical recording medium measuring about 120 mm in outer diameter, and about 1.2 mm in thickness. The optical recording medium 10 includes: a supporting base 11; a light-transmissive layer 12; and a record layer 13 provided between the supporting base 11 and light-transmissive layer 12, as shown in FIG. 1B. The optical recording medium 10 according to the embodiment is a write-once type optical recording medium such that data can be recorded thereon and reproduced therefrom by applying a laser beam 50 having a wavelength $\lambda$ of 380 to 450 nm, more preferably about 405 nm to a surface of the light-transmissive layer 12, i.e. the light-incident surface 12a. In data recording and reproduction on the optical recording medium 10, an objective 51 having a numerical aperture of 0.65 or larger, more preferably about 0.85 is used, thereby making the setting, $\lambda/NA \leq 640$ nm, where the wavelength of the laser beam 50 is $\lambda$, and the numerical aperture of the objective 51 is NA.

The supporting base 11 is a disc-like base having a thickness of about 1.1 mm used to secure the thickness (about 1.2 mm) required for the optical recording medium 10. On one surface of the supporting base, a land 11a and a groove 11b, both for guiding a laser beam 50, are formed in spiral patterns whirling from a vicinity of a center portion thereof toward an outer edge portion or the reverse direction, or formed in concentric circles. As the material for the supporting base 11, various materials may be used. For example, such materials include glass, ceramics, and resins. Of these materials, resins are more preferable from the viewpoint of the ease of forming. Such resins includes polycarbonate resin, olefin resin, acrylic resin, epoxy resin, polystyrene resin, polyethylene resin, polypropylene resin, silicone resin, fluorine-based resin, ABS resin, and urethane resin. Of these resins, polycarbonate resin and olefin resin are especially preferable from the viewpoints of the ease of processing, or others. However, the supporting base 11 doesn't necessarily have a high optical transparency because the supporting base 11 is not located on the optical path of the laser beam 50.

For preparing the supporting base 11, it is preferable to use the injection molding in which a stamper is used. However, the supporting base 11 may be prepared by another method such as a photopolymer (2P) technique.

The light-transmissive layer 12 is a layer constituting a part of the optical path of the laser beam 50, the thickness of which is preferably set within a range of 10 to 200 μm, and more preferably, it is set at about 100 μm. The material for the light-transmissive layer 12 is not particularly limited as long as it is a material having a light transmissivity sufficiently high in a wavelength band of a laser beam 50 to be used. However, it is preferable to use an acrylic or epoxy-based ultraviolet-curing resin as such material. Alternatively, the light-transmissive layer 12 may be formed by using a light-transmissive sheet of a light-transmissive resin and an adhesive agent or a tackiness agent instead of the film formed by curing an ultraviolet-curing resin.

The record layer 13 is a layer in which an irreversible record mark is to be formed by irradiation of the laser beam 50. While various materials may be used as the material for the record layer 13, it is preferable to use a material composed of: a dielectric base material containing, as its main component, an admixture of ZnS and $SiO_2$ or LaSiON (i.e. an admixture of $La_2O_3$, $SiO_2$, and $Si_3N_4$); and magnesium and/or aluminum added in the dielectric base material.

When an admixture of ZnS and $SiO_2$ is used as the main component of the dielectric base material included by the record layer 13, it is preferable to set the molar ratio of ZnS vs. $SiO_2$ within a range of 50:50 to 90:10, and most preferably at 80:20 approximately. In addition, when LaSiON is used as the main component of the dielectric base material, it is preferable to set the molar ratio of $SiO_2$ vs. sum of $Si_3N_4$ and $La_2O_3$ within a range of 10:90 to 50:50. While "main component" herein implies that the percentage of a material in question (the admixture of ZnS and $SiO_2$ or LaSiON) in the dielectric base material is 50 atomic percent (atomic %) or larger, it is especially preferable that the percentage is 80 atomic % or larger. It is preferable that the amount of magnesium and/or aluminum to be added in the dielectric base material is set within a range of 18 to 55 atomic %, especially preferable within a range 20 to 35 atomic %, and most preferable at 25 atomic %.

The structure of the optical recording medium 10 according to the embodiment is as described above, in which a record mark can be formed in the record layer 13 by applying an intensity-modulated laser beam 50 to the record layer 13 from the side of the light-incident surface 12a. The length of each record mark and the length (of a space) between record marks (i.e. between edges) are set to be multiple of a clock cycle T, i.e. nT (n=integer). For example, when (1,7) RLL modulation system is adopted, the lengths of each record mark and the space are set at any of 2T to 8T.

However, in order to perform the recording on such optical recording medium 10 at a high linear velocity, a heat amount required per unit time is increased. For increase in the heat amount per unit time, it is useful to use a pulse train pattern (solid pattern) by which one ON-pulse pattern is used to form one record mark. However, as already described, use of such pulse train pattern produces an unwanted heat pocket in the record layer 13 in forming a long record mark, thereby causing a thermal interference and thus deteriorating recording properties. Especially, the optical recording medium 10 according to the embodiment includes no reflection film as shown in FIG. 1B and as such, the recording medium is hard to dissipate the heat produced by the laser beam 50 and remarkably easy to have a heat pocket caused therein.

Allowing for the foregoing, in the invention, one ON-pulse pattern and one OFF-pulse pattern following it are used in forming a record mark shorter than the specified length (=X), and two ON-pulse patterns and two OFF-pulse patterns respectively following them are used in forming a record mark longer than the specified length.

Figure 2A:
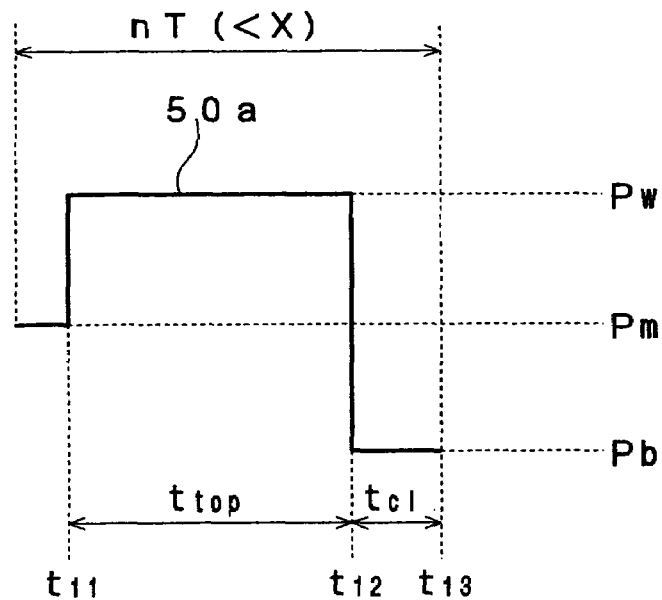
FIGS. 2A and 2B are views showing specific pulse train patterns for a laser beam 50 in recording. Of the drawings.
Figure 2B:
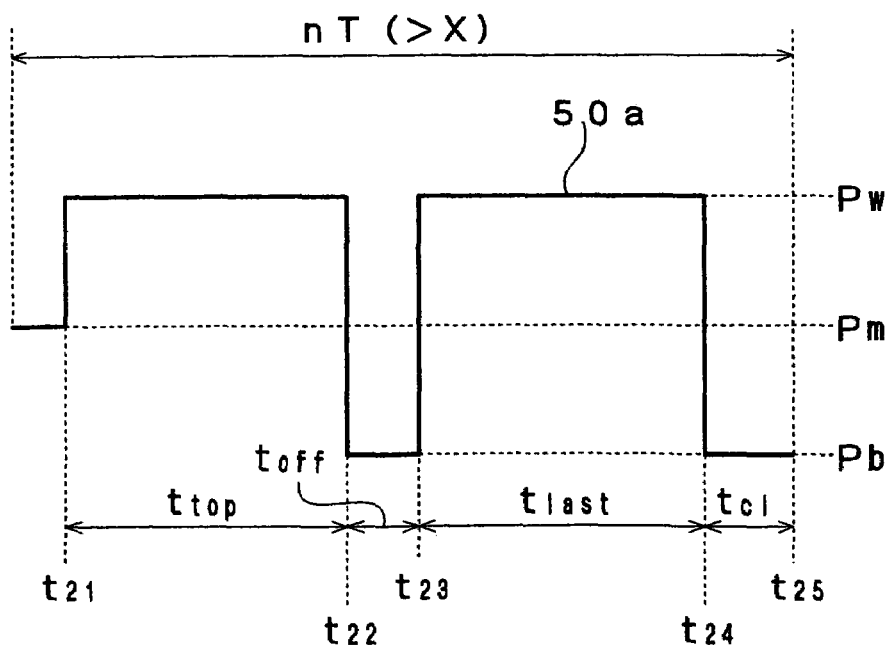

FIGS. 2A and 2B are views showing specific pulse train patterns for a laser beam 50 in recording. Of the drawings, FIG. 2A shows a pulse train pattern when a record mark shorter than the specified length X is formed, and FIG. 2B shows a pulse train pattern when a record mark longer than the specified length X is formed.

As shown in FIG. 2A, in a case where a record mark to be formed is shorter than the specified length X (nT<X), the intensity 50a of a laser beam is first set at a medium power level Pm. After that, at Time $t_{11}$ the laser beam intensity is changed from the medium power level Pm to recording-power level Pw, and then it is changed from the recording-power level Pw to base power level Pb at Time $t_{12}$, with proviso that the change in the intensity of a laser beam takes a certain length of transition time and as such, "Time" herein refers to a timing at which the intensity change reaches the midpoint between a pre-transition level and a post-transition level.

The period during which the intensity 50a of the laser beam 50 is set at the recording-power level Pw coincides with a period during which a heat required for the formation of a record mark is applied, and "ON-pulse pattern" refers to a waveform portion corresponding to such period. More specifically, it refers to a waveform portion during which the intensity 50a of the laser beam 50 is caused to transition from the base power level Pb or medium power level Pm to the recording-power level Pw, and subsequently from the recording-power level Pw to the base power level Pb. The length of ON-pulse pattern is defined by a period from the time when the intensity 50a of the laser beam 50 reaches the midpoint between a pre-rising level (i.e. the base power level Pb or medium power level Pm) and a post-rising level (i.e. the recording-power level Pw) to the time when the intensity 50a reaches the midpoint between a pre-decreasing level (i.e. the recording-power level Pw) and a post-decreasing level (i.e. the base power level Pb).

As for the pulse train pattern shown in FIG. 2A, the waveform of the period $t_{top}$ from Time $t_{11}$ to Time $t_{12}$ makes an ON-pulse pattern and therefore the number of ON-pulse patterns is one. In addition, the period during which the intensity 50a of the laser beam is set at the base power level Pb corresponds to a period to cool the record layer 13. A waveform portion corresponding to such cooling period is referred to as "OFF-pulse pattern." In regard to the pulse train pattern shown in FIG. 2A, the waveform of the period $t_{cl}$ from Time $t_{12}$ to Time $t_{13}$ makes an OFF-pulse pattern. More specifically, it refers to a waveform portion during which the intensity 50a of the laser beam 50 is caused to transition from the recording-power level Pw to the base power level Pb, and subsequently from the base power level Pb to the recording-power level Pw or medium power level Pm. The length of OFF-pulse pattern is defined by a period from the time when the intensity 50a of the laser beam 50 reaches the midpoint between a pre-decreasing level (i.e. the recording-power level Pw) and a post-decreasing level (i.e. the base power level Pb) to the time when the intensity 50a reaches the midpoint between a pre-rising level (i.e. the base power level Pb) and a post-rising level (i.e. the recording-power level Pw or medium power level Pm).

As described above, in a case where a record mark to be formed is shorter than the specified length X (nT<X), the number of ON-pulse patterns is one, i.e. "solid pattern" is used and. On this account, it becomes possible to secure a sufficient heat amount per unit time even when the targeted recording linear velocity is high. Also, it becomes possible to form a record mark having a good shape.

On the other hand, as shown in FIG. 2B, in a case where a record mark to be formed is longer than the specified length X (nT>X), the intensity 50a of a laser beam is first set at the medium power level Pm. After that, at Time $t_{21}$ the laser beam intensity is changed from the medium power level Pm to recording-power level Pw, and then it is changed from the recording-power level Pw to base power level Pb at Time $t_{22}$. Then, after the laser beam intensity is changed from the base power level Pb to the recording-power level Pw again at Time $t_{23}$, it is changed from the recording-power level Pw to the base power level Pb at Time $t_{24}$.

As for the pulse train pattern shown in FIG. 2B, the waveforms of the period $t_{top}$ from Time $t_{21}$ to Time $t_{22}$ and the period $t_{last}$ from Time $t_{23}$ to Time $t_{24}$ make ON-pulse patterns and therefore the number of ON-pulse patterns is two. In addition, the period between the ON-pulse patterns, during which the intensity 50a of the laser beam is set at the base power level Pb, corresponds to a period to cool the record layer 13, i.e. makes a first OFF-pulse pattern. In regard to the pulse train pattern shown in FIG. 2B, the waveform of the period $t_{off}$ from Time $t_{22}$ to Time $t_{23}$ makes the second OFF-pulse pattern. The second OFF-pulse pattern is the waveform of the period $t_{cl}$ from Time $t_{24}$ to Time $t_{25}$. In the pulse train pattern shown in FIG. 2B, the length $t_{cl}$ of the second OFF-pulse pattern is made constant regardless of the length of a record mark to be formed.

As described above, in a case where a record mark to be formed is longer than the specified length X (nT>X), the number of ON-pulse patterns is two, and one OFF-pulse pattern is located between the ON-pulse patterns. On this account, an unwanted heat pocket becomes hard to arise in the record layer even when a sufficient heat amount per unit time is secured, and thus it becomes possible to form a record mark having a good shape. In addition, the length $t_{cl}$ of the second OFF-pulse pattern is made constant and as such, the degree of the thermal interference with a record mark to be formed subsequently is rendered almost constant regardless of the kind of the record mark and thus a deviation in the length of the space region between a record mark in question and another record mark to be recorded subsequently becomes less prone to being caused. In other words, it becomes possible to improve the jitter of a space region (i.e. space jitter).

Also, for the pulse train pattern shown in FIG. 2B, it is preferable that the longer the length of a record mark to be formed is, the longer the length $t_{off}$ of the first OFF-pulse pattern located between the two ON-pulse patterns is set to be. This makes it possible to prevent the occurrence of a heat pocket effectively in forming a longer mark, which is prone to cause a heat pocket.

Further, when the sum of the lengths of the two ON-pulse patterns, namely the sum of the periods $t_{top}$ and $t_{last}$, is represented by $t_{total}$, it is preferable to set the $t_{total}$ as follows:

$nT*0.70 \leq t_{total} \leq nT*0.85.$

It is more preferable to set the $t_{total}$ as follows:

$nT*0.75 \leq t_{total} \leq nT*0.80.$

This makes a heat amount to be applied optimal and as such, it becomes possible to form a record mark having a good shape.

In regard to the relation between the length $t_{top}$ of the ON-pulse pattern to be applied first and the length $t_{last}$ of the ON-pulse pattern to be applied last, when the sum of the periods $t_{top}$ and $t_{last}$ is represented by $t_{total}$ as described above, it is preferable to make the setting as follows:

$t_{total}*0.45 \leq t_{top} \leq t_{total}*0.65.$

It is more preferable to make the setting as follows:

$t_{total}*0.50 \leq t_{top} \leq t_{total}*0.60.$

This is because when the difference in length between the two ON-pulse patterns is too large, heating by the shorter ON-pulse pattern doesn't work out effectively, deteriorating the jitter.

Further, as for the length $t_{cl}$ of the second OFF-pulse pattern used in forming a record mark with two ON-pulse patterns, it is preferable to set the length within a range from 0.4T to 0.5T inclusive. The reason for this is twofold. The first is that when the length $t_{cl}$ of the second OFF pulse pattern is made too long, the length $t_{off}$ of the first OFF-pulse pattern must be shortened accordingly, thereby excessively reducing the kinds of record marks which can be formed using the two ON-pulse patterns. The second is that when the length $t_{cl}$ of the second OFF-pulse pattern is made too short reversely, the length $t_{off}$ of the first OFF-pulse pattern must be made longer, whereby the first OFF-pulse pattern could cause the record mark to dispart.

Now, in regard to the specified length X, it is preferable to set the length X at a length given by 0.82*λ, i.e. the length corresponding to the diameter of a beam spot, where λ is the wavelength of the laser beam 50, and NA is the numerical aperture of the objective 51 for condensing the laser beam 50. This is based on the consideration concerning the fact that continuously irradiating the record layer 13 with the laser beam 50 at the recording-power level Pw makes the temperature of the record layer 13 highest in the location where a trailing edge portion of the beam spot impinges on the record layer 13, whereby the portion of the record layer in that location is overheated. This implies that the laser beam 50 with its intensity fixed at the recording-power level Pw over all the periods will cause an excessive heat pocket when the beam spot goes through a certain point. Therefore, when the diameter of the beam spot is defined as "specified length X," it becomes possible to prevent the occurrence of such heat pocket.

The specific pulse train patterns in the embodiment are as described above.

It is preferable that the information to determine such pulse train patterns is saved in the optical recording medium 10 as "information for setting recording conditions." If information for setting recording conditions like this is saved in the optical recording medium 10, when a user executes the data recording actually, the information recording apparatus can read out the information for setting recording conditions to decide a pulse train pattern based on the information.

As for the information for setting recording conditions, it is preferable that the information includes information required for determination of various conditions (e.g. recording linear velocity), which are requisite for data recording on the optical recording medium 10, as well as pulse train patterns. The information for setting recording conditions may be recorded in wobbles or prepits, or otherwise it may be recorded in the record layer 13 as data. Also, the information for setting recording conditions may not only directly show various conditions requisite for data recording but also specify any of the various conditions previously stored in the information recording apparatus thereby to indirectly determine a pulse train pattern.

The invention is not limited the above embodiments, and various changes and modifications may be made within a scope of the invention stated in claims. It is needless to say that such changes and modifications are included in the scope of the invention.

For example, while the optical recording medium 10 according to the above embodiment is arranged so that the record layer 13 is directly sandwiched between the supporting base 11 and light-transmissive layer 12, a dielectric layer may be provided on at least one of the top and bottom surfaces of the record layer 13 thereby to protect the record layer 13 physically and chemically.

EXAMPLE

An example of the invention will be described below. However, the invention is not limited to the example in any way.

[Preparation of Test Samples]

Test samples each having the same structure as that of the optical recording medium 10 shown in FIG. 1 were prepared by the following method.

First, a disc-shaped supporting base 11 of polycarbonate, measuring about 1.1 mm in thickness, about 120 mm in diameter and having a land 11a and a groove 11b formed on its surface was prepared by injection molding. The depth of the groove 11b was set at about 21 nm, and the width thereof was set at about 169 nm. The track pitch was set at about 320 nm.

Next, the supporting base 11 was loaded into a sputtering apparatus. Then, both a mixed target of ZnS and $SiO_2$ (whose molar ratio=80:20) and a target of magnesium were used to form a 36 nm-thick record layer 13 on the surface of the base where the land 11a and groove 11b are formed by sputtering. The chemical compositions of Zn, Si, Mg, O, S contained in the record film 13 were 22.6, 9.3, 25.0, 18.6, and 24.5 atomic % respectively.

Then, the record layer 13 was coated with an ultraviolet-curing acrylic resin by spin-coating and irradiated with ultraviolet radiation thereby to form a light-transmissive layer 12 having a thickness of about 100 μm. In this way, test samples were prepared.

[Evaluation 1]

The resulting test samples were loaded into an optical disc evaluating apparatus (an optical disc evaluating apparatus DDU-1000 manufactured by Pulstec Industrial, Co., Ltd.). Then, the samples were irradiated with a laser beam with a wavelength of about 405 nm from the side of the light-incident surface 12a toward the record layer 13 through an objective with a numerical aperture of about 0.85 while being rotated at a linear velocity of about 19.7 m/s. During the operation, 1,7 RLL mixed signals (2T-8T) were recorded.

In regard to pulse train patterns, the pulse train pattern shown in FIG. 2A was used for the marks 2T to 4T, and the pulse train pattern shown in FIG. 2B was used for the marks 5T to 8T. The medium power level Pm was set at 5.0 mW. The base power level Pb was set at 2.5 mW. The recording-power level Pw was set within a range of 11.0 to 12.6 mW variously. The lengths of $t_{top}$, $t_{last}$, $t_{off}$, and $t_{cl}$ were set for each record mark as shown in Table 1.

TABLE 1

| Record Mark | $t_{top}$ | $t_{off}$ | $t_{last}$ | $t_{cl}$ |
|---|---|---|---|---|
| 2T | 1.7T | — | — | 0.1T |
| 3T | 2.3T | — | — | 0.4T |
| 4T | 3.1T | — | — | 0.5T |
| 5T | 2.1T | 0.2T | 1.8T | 0.5T |
| 6T | 2.6T | 0.3T | 2.2T | 0.5T |
| 7T | 2.9T | 0.6T | 2.6T | 0.5T |
| 8T | 3.4T | 1.0T | 2.7T | 0.5T |

The recorded signals were reproduced at a linear velocity of about 4.9 m/s and equalized in their waveform by an equalizer, followed by measuring jitters using a Time Interval Analyzer TA720 manufactured by Yokogawa Electric Corp.

Figure 3:
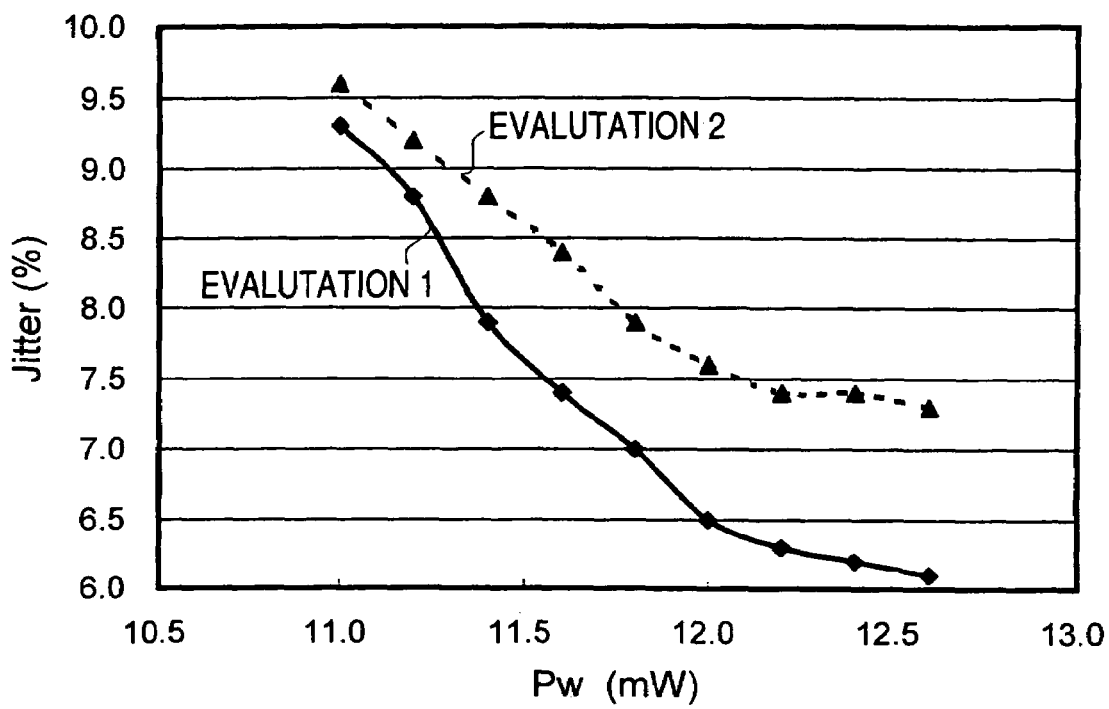
FIG. 3 is a graph showing the results of Characterizations 1 and 2.

The results of the measurements are shown in FIG. 3. As shown in FIG. 3, the jitter becomes better as the recording-power level Pw is set at a higher value. When the recording-power level Pw was set at 12.6 mW, a remarkably low value as low as about 6.1% was obtained.

[Evaluation 2]

The signal recording and reproduction and the measurement of jitters were performed as in the case of Characterization 1 except that the pulse train pattern (solid pattern) shown in FIG. 2A was used to form all the record marks (2T to 8T), and the lengths of $t_{top}$ and $t_{cl}$ were set as shown in Table 2.

TABLE 2

| Record Mark | $t_{top}$ | $t_{off}$ | $t_{last}$ | $t_{cl}$ |
|---|---|---|---|---|
| 2T | 1.7T | — | — | 0.1T |
| 3T | 2.3T | — | — | 0.4T |
| 4T | 3.1T | — | — | 0.5T |
| 5T | 4.0T | — | — | 0.6T |
| 6T | 4.9T | — | — | 0.7T |
| 7T | 5.9T | — | — | 0.7T |
| 8T | 6.8T | — | — | 0.8T |

The results of the Characterization 2 are shown in FIG. 3 together with those of Characterization 1. As shown in FIG. 3, it was confirmed that the jitter was worse in comparison with that obtained from Characterization 1.

[Evaluation 3]

The signal recording and reproduction and the measurement of jitters were performed as in the case of Characterization 1 except that the recording-power level Pw was fixed at 12.6 mW, and when the marks 5T to 8T were formed, $t_{total}$ was made constant and the ratios of $t_{top}$ and $t_{last}$ were set at various values.

Figure 4:
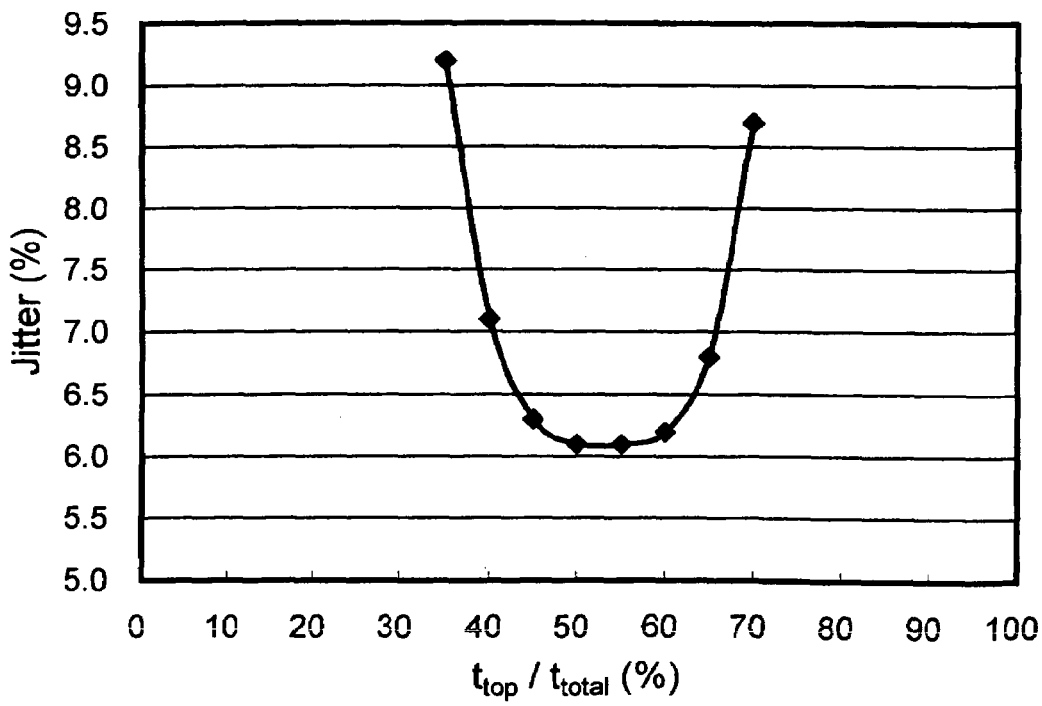
FIG. 4 is a graph showing the result of Characterization 3.

The results of the measurements are shown in FIG. 4. As shown in FIG. 4, it was confirmed that the jitter was less than or equal to 6.5% within the following range:

$$t_{total}*0.45 \leq t_{top} \leq t_{total}*0.65.$$

Also, it was confirmed that the jitter was the best within the following range:

$$t_{total}*0.50 \leq t_{top} \leq t_{total}*0.60.$$

[Evaluation 4]

The signal recording and reproduction were performed in conditions where the length $t_{cl}$ of an OFF-pulse pattern required to fix, i.e. the second OFF-pulse pattern when two ON-pulse patterns are used, was set variously. When $t_{cl}$ was fixed at 0.4T, the recording was performed under the conditions shown in Table 3. When $t_{cl}$ was fixed at 0.6T, the recording was carried out under the conditions shown in Table 4. When $t_{cl}$ was fixed at 0.7T, the recording was executed under the conditions shown in Table 5.

TABLE 3

| Record Mark | $t_{top}$ | $t_{off}$ | $t_{last}$ | $t_{cl}$ |
|---|---|---|---|---|
| 2T | 1.7T | — | — | 0.1T |
| 3T | 2.3T | — | — | 0.4T |
| 4T | 3.1T | — | — | 0.4T |
| 5T | 2.0T | 0.3T | 1.9T | 0.4T |
| 6T | 2.4T | 0.6T | 2.1T | 0.4T |
| 7T | 2.7T | 1.0T | 2.4T | 0.4T |
| 8T | 3.0T | 1.6T | 2.5T | 0.4T |

TABLE 4

| Record Mark | $t_{top}$ | $t_{off}$ | $t_{last}$ | $t_{cl}$ |
|---|---|---|---|---|
| 2T | 1.7T | — | — | 0.1T |
| 3T | 2.3T | — | — | 0.4T |
| 4T | 3.1T | — | — | 0.5T |
| 5T | 4.0T | — | — | 0.6T |
| 6T | 2.6T | 0.2T | 2.3T | 0.6T |
| 7T | 3.0T | 0.4T | 2.7T | 0.6T |
| 8T | 3.4T | 0.7T | 3.0T | 0.6T |

TABLE 5

| Record Mark | $t_{top}$ | $t_{off}$ | $t_{last}$ | $t_{cl}$ |
|---|---|---|---|---|
| 2T | 1.7T | — | — | 0.1T |
| 3T | 2.3T | — | — | 0.4T |
| 4T | 3.1T | — | — | 0.5T |
| 5T | 4.0T | — | — | 0.6T |
| 6T | 4.9T | — | — | 0.7T |
| 7T | 3.1T | 0.2T | 2.8T | 0.7T |
| 8T | 3.5T | 0.4T | 3.2T | 0.7T |

Figure 5:
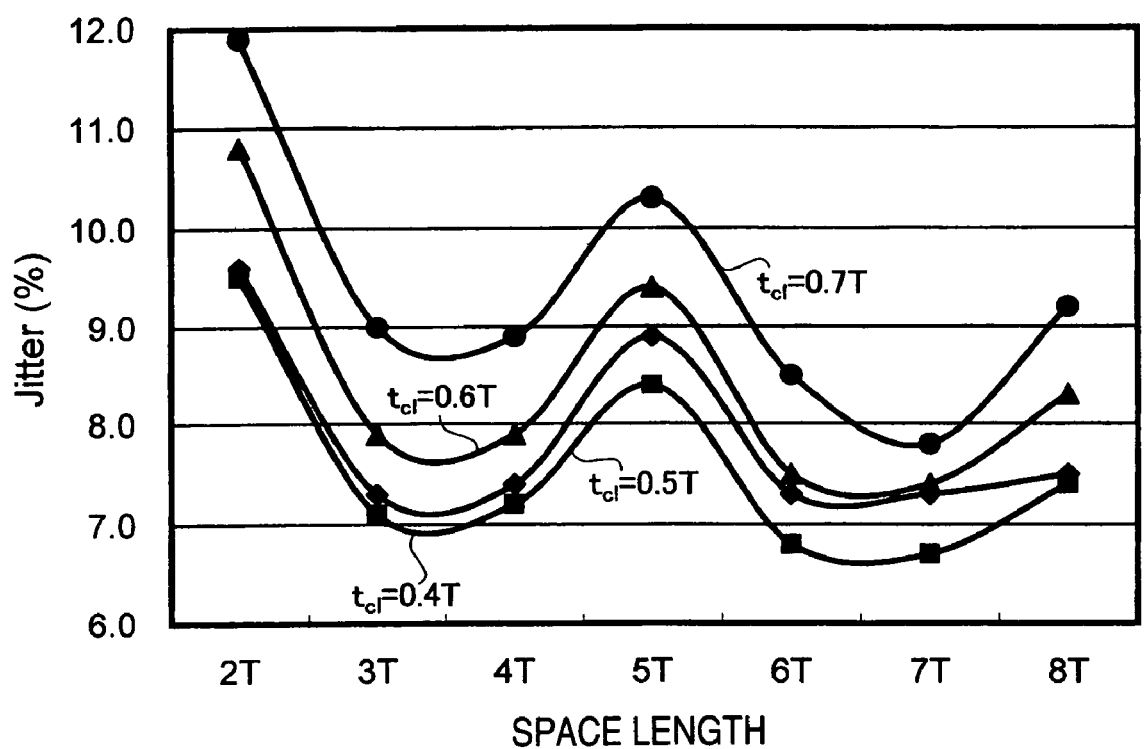
FIG. 5 is a graph showing the result of Characterization 4.

Recorded signals were reproduced, followed by measuring space jitters. The results of the measurements are shown in FIG. 5. Also, FIG. 5 shows the jitters obtained when the recording was performed under the conditions shown in Table 1 ($t_{cl}$=0.5T) together.

As shown in FIG. 5, the space jitter was the best when the length $t_{cl}$ of the second OFF-pulse pattern was 0.5T (Characterization 1). Also, when the length $t_{cl}$ of the second OFF-pulse pattern was 0.4T, a relatively good space jitter was obtained. However, it was confirmed that the space jitter became worse as the length $t_{cl}$ of the second OFF-pulse pattern was made longer such as 0.6T and 0.7T. From above, it has been confirmed that it is preferable to set the length $t_{cl}$ of the second OFF-pulse pattern when two ON-pulse patterns are used, within a range of 0.4T to 0.5T. Particularly, it has been confirmed that it is the most preferable to set the length $t_{cl}$ at a value of about 0.5T.

While the invention has been described in detail and in reference to the particular embodiments, it is apparent to those skilled in the art that various changes and modifications may be made without departing from the spirit and scope of the invention.

The application is based on Japanese Patent Application No. 2004-34368 filed on Feb. 16, 2004, whose subject matter is incorporated herein by reference.

What is claimed is:

1. An information recording method for recording information, comprising:
    modulating a laser beam according to a pulse train pattern including at least a recording-power level, a base power level, and a medium power level having a power intermediate between the recording-power and base power levels; and
    irradiating a write-once optical recording medium having a base and a record layer on the base with the laser beam modulated according to the pulse train pattern to form a record mark in the record layer,
    wherein the pulse train pattern includes at least one ON-pulse pattern and at least one OFF-pulse pattern,
    the ON-pulse pattern transitions from one of the base power level and the medium power level to the recording-power level, and then transitions from the recording-power level to the base power level,
    the OFF-pulse pattern includes the base power level following the ON-pulse pattern, and when the record mark longer than a specified length is formed, the number of the at least one ON-pulse pattern to be used is two, and a length of the OFF-pulse pattern following the last ON-pulse pattern is made constant regardless of a length of the record mark to be formed and a length of the OFF-pulse pattern located between the two ON-pulse patterns is made longer as the length of the record mark to be formed is longer, wherein $$t_{total}*0.45 \leq t_{top} \leq t_{total}*0.65,$$

where a length of first applied one of the two ON-pulse patterns used in forming the record mark longer than the specified length is $t_{top}$, and a sum of the lengths of the two ON-pulse patterns used in forming the record mark longer than the specified length is $t_{total}$.

2. The information recording method of claim 1, wherein when the record mark shorter than the specified length is formed, the number of the at least one ON-pulse pattern is one.

3. The information recording method of claim 1, wherein the specified length is 0.82*λ/NA, where a wavelength of the laser beam is λ, a numerical aperture of an objective for condensing the laser beam is NA.

4. The information recording method of claim 1, wherein $$nT*0.70 \leq t_{total} \leq nT*0.85,$$

where the length of the record mark to be formed is nT (T is a clock cycle).

5. The information recording method of claim 1, wherein of the two ON-pulse patterns used in forming the record mark longer than the specified length, a length of the OFF-pulse pattern following the last ON-pulse pattern is from 0.4T to 0.5T inclusive (T is a clock cycle).

6. The information recording method of claim 1, wherein the laser beam irradiation is performed under the following condition:

$$λ/NA \leq 640 \text{ nm},$$

where a wavelength of the laser beam is λ, and a numerical aperture of an objective for condensing the laser beam is NA.

7. An information recording apparatus for recording information by irradiating a write-once optical recording medium having a base and a record layer on the base, comprising:
    a laser configured to emit a laser beam modulated according to a pulse train pattern including at least a recording-power level, a base power level, and a medium power level having a power intermediate between the recording-power and base power levels to form a record mark in the record layer, the apparatus arranged so that the pulse train pattern includes at least one ON-pulse pattern and at least one OFF-pulse pattern, the ON-pulse pattern transitions from one of the base power level and the medium power level to the recording-power level, and then transitions from the recording-power level to the base power level, the OFF-pulse pattern includes the base power level following the ON-pulse pattern, and when the record mark longer than a specified length is formed, the number of the at least one ON-pulse pattern to be used is two, and a length of the OFF-pulse pattern following the last ON-pulse pattern is made constant regardless of a length of the record mark to be formed and a length of the OFF-pulse pattern located between the two ON-pulse patterns is made longer as the length of the record mark to be formed is longer, wherein $$t_{total}*0.45 \leq t_{top} \leq t_{total}*0.65,$$

where a length of first applied one of the two ON-pulse patterns used in forming the record mark longer than the specified length is $t_{top}$, and a sum of the lengths of the two ON-pulse patterns used in forming the record mark longer than the specified length is $t_{total}$.

8. The information recording apparatus of claim 7, arranged so that when the record mark shorter than the specified length is formed, the number of the at least one ON-pulse pattern is one.

9. The information recording apparatus of claim 7, wherein the specified length is $0.82*\lambda/NA$, where a wavelength of the laser beam is $\lambda$, a numerical aperture of an objective for condensing the laser beam is NA.

10. The information recording apparatus of claim 7, arranged so that $$nT*0.70 \leq t_{total} \leq nT*0.85,$$

where the length of the record mark to be formed is nT (T is a clock cycle).

11. The information recording apparatus of claim 7, arranged so that, of the two ON-pulse patterns used in forming the record mark longer than the specified length, a length of the OFF-pulse pattern following the last ON-pulse pattern is from 0.4T to 0.5T inclusive (T is a clock cycle).

12. The information recording apparatus of claim 7, arranged so that the following condition is satisfied:

$$\lambda/NA \leq 640 \text{ nm},$$

where a wavelength of the laser beam is $\lambda$, and a numerical aperture of an objective for condensing the laser beam is NA.

13. An information recording method comprising:

modulating a laser beam according to a plurality of pulse train patterns each including at least a recording-power level, a base power level, and a medium power level having a power intermediate between the recording-power and base power levels; and irradiating a write-once optical recording medium having a base and a record layer on the base with the laser beam modulated according to the plurality of pulse train patterns to form a plurality of record marks in the record layer, each of the pulse train patterns corresponding to a record mark in the plurality of record marks, and each of the plurality of record marks in the plurality of record marks having a different length, wherein the plurality of pulse train patterns includes a first pulse train pattern and at least two second pulse train patterns, the first pulse train pattern corresponds to a record mark in the plurality of record marks having a length shorter than a specified length, and includes only one ON-pulse pattern and only one OFF-pulse pattern, each of the second pulse train patterns corresponds to a record mark in the plurality of record marks having a different length longer than the specified length, includes only two ON-pulse patterns and only two OFF-pulse patterns, and each of the second pulse train patterns differs from other second pulse train patterns in a length of only one of the two OFF-pulse patterns, each ON-pulse pattern transitions from one of the base power level and the medium power level to the recording-power level, and then transitions from the recording-power level to the base power level, each OFF-pulse pattern includes the base power level following the ON-pulse pattern, wherein $$t_{total}*0.45 \leq t_{top} \leq t_{total}*0.65,$$

where a length of first applied one of the two ON-pulse patterns used in forming the record mark longer than the specified length is $t_{top}$, and a sum of the lengths of the two ON-pulse patterns used in forming the record mark longer than the specified length is $t_{total}$.

14. The method of claim 13, wherein each of the second pulse train patterns differs from the other second pulse train patterns in a length of the OFF-pulse pattern located between the two ON-pulse patterns.

* * * * *